United States Patent
Shinohara et al.

(10) Patent No.: US 7,135,140 B2
(45) Date of Patent: Nov. 14, 2006

(54) METHOD OF PRODUCING SILICON NITRIDE HONEYCOMB FILTER

(75) Inventors: Nobuhiro Shinohara, Kanagawa (JP); Toshinari Watanabe, Kanagawa (JP); Eiji Yanagisawa, Kanagawa (JP); Naomichi Miyakawa, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 15 days.

(21) Appl. No.: 10/901,171

(22) Filed: Jul. 29, 2004

(65) Prior Publication Data

US 2005/0043166 A1    Feb. 24, 2005

(30) Foreign Application Priority Data

Jul. 29, 2003    (JP)    ............................. 2003-281812

(51) Int. Cl.
    *C04B 35/584*    (2006.01)
(52) U.S. Cl. .................. 264/683; 264/630; 264/647
(58) Field of Classification Search ............... 264/628, 264/630, 642, 647, 43, 44, 683
See application file for complete search history.

(56) References Cited

U.S. PATENT DOCUMENTS

| 5,004,709 | A | * | 4/1991 | Stranford et al. | .......... | 501/97.2 |
| 5,756,411 | A | * | 5/1998 | Nakahata et al. | .......... | 501/97.1 |
| 6,565,797 | B1 | | 5/2003 | Miyakawa et al. | | |
| 6,593,261 | B1 | | 7/2003 | Shinohara et al. | | |
| 6,849,213 | B1 | * | 2/2005 | Miyakawa et al. | ............ | 264/44 |
| 2003/0006518 | A1 | | 1/2003 | Miyakawa et al. | | |
| 2003/0186801 | A1 | * | 10/2003 | Inoue et al. | ................ | 501/97.1 |
| 2005/0023735 | A1 | * | 2/2005 | Miyakawa et al. | .......... | 264/628 |
| 2005/0023736 | A1 | * | 2/2005 | Matsuzaki et al. | .......... | 264/630 |
| 2005/0043166 | A1 | | 2/2005 | Shinohara et al. | | |

FOREIGN PATENT DOCUMENTS

| EP | 784038 A2 * | 7/1997 |
| EP | 1 160 223 | 12/2001 |
| EP | 1 167 321 | 1/2002 |
| JP | 52-121613 | 10/1977 |
| JP | 6-256069 | 9/1994 |
| JP | 7-187845 | 7/1995 |
| JP | 8-59364 | 3/1996 |
| JP | 2002-284585 | 10/2002 |
| WO | WO 8800933 A1 * | 2/1988 |
| WO | WO 01/47833 A1 | 7/2001 |
| WO | WO 2004/050318 | 6/2004 |
| WO | WO 2004/067147 | 8/2004 |

OTHER PUBLICATIONS

U.S. Appl. No. 10/901,171, filed Jul. 29, 2004, Shinohara, et al.
U.S. Appl. No. 10/892,200, filed Jul. 16, 2004, Miyakawa et al.
U.S. Appl. No. 10/216,815, filed Aug. 13, 2002, Miyakawa et al.
U.S. Appl. No. 09/975,262, filed Oct. 12, 2001, Miyakawa.
U.S. Appl. No. 10/140,162, filed May 8, 2002, Miyakawa.
U.S. Appl. No. 10/900,090, filed Jul. 28, 2004, Matsuzaki et al.
U.S. Appl. No. 10/901,158, filed Jul. 29, 2004, Suzuki et al.
U.S. Appl. No. 11/240,509, filed Oct. 3, 2005, Shinohara et al.
U.S. Appl. No. 11/287,461, filed Nov. 28, 2005, Shinohara et al.

* cited by examiner

*Primary Examiner*—Steven P. Griffin
*Assistant Examiner*—Carlos Lopez
(74) *Attorney, Agent, or Firm*—Oblon, Spivak, McClelland, Maier & Neustadt, P.C.

(57) ABSTRACT

A method for producing a silicon nitride honeycomb filter, which comprises heat-treating in a nitrogen atmosphere a green body comprising from 50 to 85 mass % of metal silicon particles having an average particle diameter of from 5 to 50 μm, from 5 to 30 mass % of glass hollow particles having a softening temperature of from 400 to 1000° C. and from 10 to 20 mass % of an organic binder to convert metal silicon substantially to silicon nitride.

10 Claims, No Drawings

METHOD OF PRODUCING SILICON NITRIDE HONEYCOMB FILTER

The present invention relates to a method for producing a silicon nitride honeycomb filter suitable as a honeycomb filter for removing powder dust, etc. contained in a high temperature exhaust gas.

Silicon nitride has characteristics excellent in heat resistance, corrosion resistance, chemical resistance, mechanical strength, etc. and is expected to be useful for a filter (hereinafter referred to as DPF) for removal of fine particles (hereinafter referred to as particulates) discharged from a diesel engine or for a filter for collection or removal of dust under a high temperature or corrosive environment. Methods for producing such silicon nitride filters may generally be classified on the basis of starting materials into a production method wherein silicon nitride particles are used as the starting material (JP-A-6-256069, JP-A-7-187845, JP-A-8-59364) and a production method wherein metal silicon particles are used as the starting material (JP-A-52-121613, WO01/47833, JP-A-2002-284585). A production method wherein metal silicon particles are used as the starting material, and silicon nitride is produced by direct nitriding, has a characteristic such that the material cost is usually low as compared with a production method wherein silicon nitride particles are used as the starting material, and thus it is superior from the viewpoint of the production cost.

As a conventional technique for the production method wherein metal silicon is used as the starting material, a method has been proposed wherein a silicon nitride porous body is obtained by nitriding treatment of a green body made of fine metal silicon powder (JP-A-52-121613). However, in order to obtain a porous body having a high porosity, it is necessary to subject a metal silicon green body having a low density of the green body to nitriding treatment, and in such a case, fine, whisker-like silicon nitride fibers are likely to form on the surface or in the interior, whereby the average pore diameter of the porous body tends to be small.

As a means to solve such a problem, a method has been proposed in which a green body comprising metal silicon particles and inorganic hollow particles, is thermally treated in nitrogen to obtain a silicon nitride porous body having an average pore diameter of from 5 to 40 μm (WO01/47833). However, by this method, in a case where the material for inorganic hollow particles or the production condition is not proper, inorganic hollow particles are likely to react with nitrogen during the nitriding treatment to form a nitrogen-containing compound having a high melting point and will remain in the form of hollow particles, whereby it tends to be difficult to obtain a porous body which has a large porosity and average pore diameter and which yet has a pore distribution wherein pores having small diameters are few.

Further, a method has been proposed in which a green body composed mainly of metal silicon is prepared, and before nitriding the obtained green body composed mainly of metal silicon, the atmosphere is controlled to remove an oxide on the surface of metal silicon, and then, nitrogen gas is introduced to nitride metal silicon thereby to obtain a silicon nitride porous body (JP-A-2002-284585). However, even by this method, it is difficult to obtain a silicon nitride porous body having a sufficiently large porosity or pore diameter, and there is a problem also from the viewpoint of the productivity such that the atmosphere control is required prior to the nitriding treatment of metal silicon, whereby it is not possible to use a continuous firing furnace excellent in the productivity.

It is an object of the present invention to provide a silicon nitride honeycomb filter which has a large porosity and average pore diameter and yet has a pore distribution wherein pores having small pore diameters are few and which has a low pressure loss and is suitable as DPF, and a method for its production.

The present invention provides a method for producing a silicon nitride honeycomb filter, which comprises heat-treating in a nitrogen atmosphere a green body comprising from 50 to 85 mass % of metal silicon particles having an average particle diameter of from 5 to 50 μm, from 5 to 30 mass % of glass hollow particles having a softening temperature of from 400 to 1000° C. and from 10 to 20 mass % of an organic binder to convert metal silicon substantially to silicon nitride.

By the method of the present invention, it is possible to readily produce a silicon nitride honeycomb filter suitable for dust removal or collection. The silicon nitride honeycomb filter obtainable by the present invention is excellent in the dimensional precision, has high strength and also has an average pore diameter and porosity which are suitable for collection of particulates, etc. and which make it possible to reduce a pressure loss. Accordingly, it is suitable as a filter, particularly as DPF required to have strength, heat resistance, corrosion resistance, durability, etc.

Now, the present invention will be described in detail with reference to the preferred embodiments.

In the method for producing a silicon nitride honeycomb filter of the present invention (hereinafter referred to as the method of the present invention), a green body is used which comprises from 50 to 85 mass % of metal silicon particles having an average particle diameter of from 5 to 50 μm, from 5 to 30 mass % of glass hollow particles having a softening temperature of from 400 to 1000° C., and from 10 to 20 mass % of an organic binder.

The metal silicon particles to be used in the method of the present invention have an average particle diameter of from 5 to 50 μm. If the average particle diameter of the metal silicon particles is less than 5 μm, the pore diameters tend to be too small, thus leading to a deterioration of the function of the silicon nitride honeycomb filter (hereinafter referred to simply as the honeycomb filter) or an increase of the pressure loss. On the other hand, if the average diameter of the metal silicon particles exceeds 50 μm, no adequate strength tends to be obtainable although the porosity and the pore diameters will increase. The purity of the metal silicon particles may suitably be selected depending upon the particular purpose or application.

In the method of the present invention, the content of the metal silicon particles is from 50 to 85 mass %. If the content of the metal silicon particles is less than 50 mass %, the heat resistance, corrosion resistance, chemical resistance, mechanical strength, etc. of the honeycomb filter may likely be lower than the desired levels. On the other hand, if the content of the metal silicon particles exceeds 85 mass %, the amount of the pore-forming agent is likely to be too small, whereby the properties such as the porosity and the average particle diameter, tend to be less than the desired levels.

The glass hollow particles (hereinafter referred to simply as the hollow particles) to be used in the method of the present invention may be any ones so long as they are glass particles which are hollow i.e. not solid cored and which are capable of readily forming pores during the heat treatment. The hollow particles may have the portion corresponding to the outer skin being dense or porous, so long as they are hollow. Further, the hollow particles are preferably spherical particles in their outer shape, since they are thereby readily available. However, they may be particles other than spherical particles, so long as they are hollow.

In the method of the present invention, the softening point of the hollow particles is from 400 to 1000° C. If the softening point of the hollow particles is from 400 to 1000° C., when subjected to heat treatment in a nitrogen atmosphere, the hollow particles will be softened and melted before a nitrogen-containing compound such as silicon oxynitride ($Si_2ON_2$) will be formed. Accordingly, the hollow particle form will not substantially remain in the honeycomb filter, and it is possible to obtain a porous body having a large porosity and average pore diameter and having a pore distribution wherein pores having small pore diameters are few. The softening temperature of the hollow particles is preferably from 500 to 900° C. Particularly preferably, the softening temperature of the hollow particles is from 600 to 800° C. The glass component of such hollow particles may, for example, be soda lime borosilicate glass ($SiO_2$: 67 mass %, $B_2O_3$: 12 mass %, $Na_2O$: 6 mass %, CaO: 13 mass %, soda lime glass or borosilicate glass.

The apparent specific gravity of the hollow particles is preferably from 0.2 to 0.8. If the apparent specific gravity of the hollow particles exceeds 0.8, the desired pore diameter or porosity may not be obtainable, or the amount of the hollow particles to be incorporated tends to be too much, such being undesirable. On the other hand, if the apparent specific gravity is less than 0.2, the mechanical strength of the hollow particles themselves tends to be small, whereby the hollow particles are likely to be broken during the mixing or molding process, and the pore-forming performance tends to be substantially deteriorated.

In the method of the present invention, the average particle diameter of the hollow particles is preferably from 20 to 60 μm. If the average particle diameter of the hollow particles is less than 20 μm, the pore diameters are likely to be too small. On the other hand, if the average particle diameter exceeds 60 μm, the obtainable pore diameters tend to be too large, whereby the strength of the honeycomb filter tends to be low.

The content of the hollow particles is from 5 to 30 mass % in the green body. If the content is less than 5 mass %, the proportion of pores performing the filter function tends to be inadequate. On the other hand, if the content exceeds 30 mass %, no adequate strength tend to be obtained, although the pore diameter and porosity of the film will be large.

The blend ratio of the metal silicon particles and the hollow particles is preferably such that the metal silicon particles are from 40 to 65 vol %, and the hollow particles are within a range of from 35 to 60 vol %. Such a blend ratio is more preferably such that the metal silicon particles are from 45 to 55 vol %, and the hollow particles are from 45 to 55 vol %.

In the method of the present invention, the green body contains from 10 to 20 mass % of an organic binder. The organic binder contains a plasticizer, a dispersing agent and other molding adjuvants. As such an organic binder, an organic substance such as polyvinyl alcohol or its modified product, starch or its modified product, carboxymethylcellulose, hydroxymethylcellulose, polyvinyl pyrrolidone, an acrylic resin or an acrylic copolymer, a vinyl acetate resin or a vinyl acetate copolymer, may be used, and a plasticizer such as polyethylene glycol, propylene glycol or glycerol, may be added. In a case where a plasticizer, etc., are contained, the composition will be represented as including such a plasticizer, etc. in the mass of the organic binder.

The content of the organic binder in the green body is from 10 to 20 mass %. If the content of the organic binder is less than 10 mass %, the moldability or the mechanical strength of the green body tends to be inadequate. On the other hand, if the content of the organic binder exceeds 20 mass %, the content of the metal silicon particles or the hollow particles tends to be too small, whereby the desired porous body may not be obtained.

In the method of the present invention, a common mixing means such as a mixer or a ball mill may be used for mixing the metal silicon particles, the hollow particles and the organic binder. As a method for preparing a honeycomb green body comprising the metal silicon particles and the hollow particles, water or an organic solvent may suitably be added to the above mixed materials, followed by kneading to obtain a molding material, which is molded by e.g. extrusion molding.

As a condition for the heat treatment of the green body, preferred is heat treatment in two stages in a nitrogen atmosphere, i.e. it is preferably divided into a first stage suitable for nitriding metal silicon particles and a second stage suitable for sintering silicon nitride particles as the formed nitride.

As the heat treatment condition for the first stage, it is preferred to maintain the green body in a nitrogen atmosphere at a temperature of from 1,200 to 1,400° C. for from 3 to 24 hours. If the temperature is lower than 1,200° C., no adequate nitriding of metal silicon particles takes place. On the other hand, if the temperature exceeds 1,400° C., metal silicon particles tend to fuse in the vicinity of the fusing point (1,410° C.) of metal silicon, whereby the shape of the sintered body can not be maintained, such being undesirable. If the time for maintaining at the temperature is less than 3 hours, nitriding of metal silicon particles tends to be inadequate, such being undesirable. On the other hand, if the time for maintaining at such a temperature exceeds 24 hours, the nitriding reaction will no longer substantially proceed, and the operation cost will increase, such being undesirable.

As the condition for the heat treatment in the second stage, it is preferred to maintain the green body in a nitrogen atmosphere at a temperature of from 1,500 to 1,800° C. for from 1 to 12 hours. If the temperature is lower than 1,500° C., no adequate sintering of the silicon nitride particles will proceed, such being undesirable, and if it exceeds 1,800° C., the silicon nitride particles tend to decompose, such being undesirable. If the time for maintaining at such a temperature is less than 1 hour, no adequate sintering of the particles to one another will proceed, such being undesirable. On the other hand, if it exceeds 12 hours, silicon nitride tends to decompose especially at a high temperature, such being undesirable. Further, the heat treatment in the first stage or in the second stage, may be carried out by once lowering the temperature at an intermediate point or may be carried out continuously without lowering the temperature.

The temperature raising rate at the time of the heat treatment may suitably be selected depending upon the size, shape, etc. of the green body, but it is preferably from 50 to 600° C./hr from the viewpoint of the nitriding rate or the pore diameters. Even in a temperature-raising process, so long as the temperature is within the temperature range defined for the first stage or the second stage, the time thereby passed will be included in the time for maintaining in the first or the second stage.

Here, the nitrogen atmosphere is meant for an atmosphere which contains substantially nitrogen only and contains no oxygen, but it may contain other inert gases. The nitrogen partial pressure is preferably at least 50 kPa.

The silicon nitride honeycomb filter obtained by the method of the present invention preferably has an average pore diameter of from 10 to 30 µm as measured by a mercury immersion method. If the average pore diameter is less than 10 µm, the pore diameters of the honeycomb filter tend to be too small when a catalyst or the like is supported on the honeycomb filter, and the pressure loss of the honeycomb filter during the use tends to be large, such being undesirable. If the average pore diameter exceeds 30 µm, even if a catalyst or the like is supported on the honeycomb filter, the pore diameters tend to be too large, whereby it tends to be difficult to capture fine particles such as diesel particulates, such being undesirable.

The porosity, as measured by a mercury immersion method, of the honeycomb filter obtained by the method of the present invention is preferably from 60 to 80%. If the porosity is less than 60%, when a catalyst or the like is supported, the pressure loss of the honeycomb filter tends to be too large, such being undesirable. On the other hand, if the porosity exceeds 80%, the mechanical strength of the honeycomb filter tends to be too low, such being undesirable.

Further, if the sum of pore volumes of pores having pore diameters of at least 5 µm, is at least 70% of the sum of volumes of all pores, even if a catalyst or the like is supported, the pressure loss of the honeycomb filter can be made small during the use. Pores having pore diameters of less than 5 µm contribute little to the gas flow, whereby the effect for reducing the pressure loss is little. It is preferred that the porosity is from 60 to 80%, and the sum of pore volumes of pores having pore diameters of at least 5 µm is at least 70% of the sum of volumes of all pores, such being suitable as DPF. It is more preferred that the porosity is from 60 to 80%, and the sum of pore volumes of pores having pore diameters of at least 5 µm is at least 80% of the sum of volumes of all pores, whereby the pressure loss is small.

Now, the present invention will be described in further detail with reference to Examples of the present invention. However, it should be understood that the present invention is by no means restricted to such specific Examples.

EXAMPLES 1 TO 3

Metal silicon particles (manufactured by ELKEM, Si purity: 98%) having an average particle diameter of 22 µm, hollow particles made of soda lime borosilicate glass (manufactured by SUMITOMO 3M Limited, trade name: Scotchlite Glass Bubbles K46, apparent specific gravity: 0.46, softening point: 600° C., average particle diameter of 40 µm, trade name: Scotchlite Glass Bubbles S60, apparent specific gravity: 0.6, softening point: 600° C., average particle diameter of 30 µm), and, as an organic binder, methylcellulose and glycerol (methylcellulose:glycerol=12–16:1–2), were added in the proportions as shown in Table 1 and dry-mixed by a mixer. For the calculation of the volume ratio, the specific gravity of the metal silicon particles was taken as 2.35.

To 100 mass % of this mixture, from 50 to 52 mass % of deionized water was added, followed by kneading sufficiently by a kneader to obtain a molding material for extrusion molding. The obtained molding material for extrusion molding was extrusion-molded by a vacuum extrusion molding machine having a mold for a honeycomb green body, to obtain a green body having an outer shape of 20 mm×20 mm×150 mm, a thickness of the cell wall of 0.25 mm and a cell number of 200 cells/6.45 cm².

The obtained honeycomb green body was dried and then heated in a nitrogen atmosphere from room temperature to 800° C. at a rate of 240° C./hr and maintained at 800° C. for one hour. Then, it was heated to 1350° C. at a rate of 120° C./hr and maintained at 1350° C. for 3 hours, and then it was heated to 1750° C. at a rate of 120° C./hr and maintained at 1750° C. for 3 hours, to carry out heat treatment.

With respect to the obtained honeycomb sintered body, the pore measurement was carried out by means of a mercury immersion method. Further, identification of the crystal phase was carried out by X-ray diffraction, whereby only silicon nitride was observed with each sintered body. In Table 1, Examples 1 to 4 are Examples of the present invention. Further, the pore measurement was carried out by means of a mercury porosimeter (manufactured by YUASA-IONICS COMPANY, LIMITED, trade name: AUTOSCAN-33).

Further, with respect to Example 2, a green body having an outer shape of 145 mmϕ×160 mm, a thickness of the cell wall of 0.25 mm and a cell number of 200 cells/6.45 cm², was prepared, dried and then heated in a nitrogen atmosphere from room temperature to 800° C. at a rate of 240° C./hr and maintained at 800° C. for 1 hour. Thereafter, it was heated to 1750° C. at a rate of 120° C./hr and maintained at 1750° C. for 3 hours to carry out heat treatment. Further, in the course of the temperature raising, it was maintained for three hours at each temperature of 1250° C., 1300° C. and 1350° C. The obtained honeycomb had an average pore diameter of 11 µm and a porosity of 68%, and the proportion of pores having pore diameters of at least 5 µm was 84%. Cells of this honeycomb were alternately sealed, and then the honeycomb was subjected to engine bench test, whereby the pressure loss was measured at a flow rate of 400 m³/hr and was found to be 2.5 kPa.

TABLE 1

|  | Ex. 1 | Ex. 2 | Ex. 3 |
| --- | --- | --- | --- |
| Apparent specific gravity of hollow particles | 0.46 | 0.46 | 0.6 |
| Content of metal Si (mass %) | 66 | 72 | 67 |
| Content of hollow particles (mass %) | 19 | 14 | 17 |
| Content of organic binder (mass %) | 15 | 14 | 16 |
| Blend ratio of metal Si (vol %) | 40 | 50 | 50 |
| Blend ratio of hollow particles (vol %) | 60 | 50 | 50 |
| Sintering temperature (° C.) | 1750 | 1750 | 1750 |
| Average pore diameter (µm) | 25 | 14 | 15 |
| Porosity (%) | 72 | 60 | 67 |
| Proportion of pores having pore diameters of at least 5 µm (vol %) | 91 | 78 | 90 |

EXAMPLE 4 (COMPARATIVE EXAMPLE)

In Example 2, instead of the hollow particles of soda lime borosilicate glass, hollow particles of glass comprising 65% of $Al_2O_3$ component and 35% of $SiO_2$ component (manufactured by TAIHEIYO CEMENT CORPORATION, trade name: SL75, apparent specific gravity: 0.65, softening temperature: at least 1200° C.) were used.

So that the blend ratio of the metal silicon particles to the hollow particles would be a volume ratio of 50:50, 67 mass % of metal silicon particles having an average particle diameter of 22 µm (manufactured by ELKEM, Si purity: 98%), 20 mass % of the hollow particles and 13 mass % of methylcellulose and glycerol as an organic binder, were mixed. Then, to 100 mass % of this mixture, 51 mass % of deionized water added, followed by kneading sufficiently by a kneader to prepare a molding material for extrusion molding. The obtained molding material for extrusion molding was extrusion-molded by a vacuum extrusion molding machine having a mold for a honeycomb green body to obtain a green body having an outer shape of 20 mm×20 mm×150 mm, a thickness of the cell wall of 0.25 mm and a cell number of 200 cells/6.45 cm$^2$.

The obtained honeycomb green body was dried and then, heated in a nitrogen atmosphere from room temperature to 800° C. at a rate of 240° C./hr and maintained at 800° C. for one hour. Thereafter, it was heated to 1350° C. at a rate of 120° C./hr and maintained at 1350° C. for 3 hours, and then it was heated to 1750° C. at a rate of 120° C./hr and maintained at 1750° C. for 3 hours to carry out heat treatment.

The obtained honeycomb had an average pore diameter of 8 μm and a porosity of 54%, and the volume proportion of pores having pore diameters of at least 5 μm was 55 volume %. Identification of the crystal phase of the obtained honeycomb sintered body, was carried out by X-ray diffraction, whereby peaks of silicon nitride and silicon oxynitride were observed, and the fine structure was observed by a scanning electron microscope, whereby it was confirmed that the hollow particle form partially remained.

The silicon nitride honeycomb filter obtained by the present invention is excellent in the dimensional precision and has pore diameters and porosity suitable for collection of diesel particulates, etc. Further, the pressure loss can be made low, and accordingly, it is suitable as DPF which is required to have strength, heat resistance, corrosion resistance, durability, etc.

The entire disclosure of Japanese Patent Application No. 2003-281812 filed on Jul. 29, 2003 including the specification, claims and summary is incorporated herein by reference in its entirety.

What is claimed is:

1. A method for producing a silicon nitride honeycomb filter, which comprises:
    heat-treating in a nitrogen atmosphere a green body comprising
        from 50 to 85 mass % of metal silicon particles having an average particle diameter of from 5 to 50 μm,
        from 5 to 30 mass % of glass hollow particles having a softening temperature of from 400 to 1000° C. and
        from 10 to 20 mass % of an organic binder, to convert metal silicon substantially to silicon nitride.

2. The method for producing a silicon nitride honeycomb filter according to claim 1, wherein said glass hollow particles have an average diameter of from 20 to 60 μm.

3. The method for producing a silicon nitride honeycomb filter according to claim 2, wherein said glass hollow particles have an apparent specific gravity of from 0.2 to 0.8.

4. The method for producing a silicon nitride honeycomb filter according to claim 2, wherein glass of the glass hollow particles is soda lime borosilicate glass, soda lime glass or borosilicate glass.

5. The method for producing a silicon nitride honeycomb filter according to claim 2, wherein the heat-treating conditions are such that heat treatment of a first stage is carried out by maintaining the green body in a nitrogen atmosphere at a temperature of from 1200 to 1400° C. for from 3 to 24 hours, and then, heat treatment of a second stage is further carried out by maintaining it at a temperature within a range of from 1500 to 1800° C. for from 1 to 12 hours.

6. The method for producing a silicon nitride honeycomb filter according to claim 5, wherein said glass hollow particles have an apparent specific gravity of from 0.2 to 0.8 are used.

7. The method for producing a silicon nitride honeycomb filter according to claim 5, wherein glass of the glass hollow particles is soda lime borosilicate glass, soda lime glass or borosilicate glass.

8. The method for producing a silicon nitride honeycomb filter according to claim 5, wherein the temperature raising rate during the heat treatment is from 50 to 600° C./hr.

9. The method for producing a silicon nitride honeycomb filter according to claim 5, wherein the nitrogen partial pressure in the nitrogen atmosphere is at least 50 kPa.

10. The method for producing a silicon nitride honeycomb filter according to claim 1, wherein the volume blend ratio of the metal silicon particles and the glass hollow particles is such that the metal silicon particles are from 40 to 65 vol % and the glass hollow particles are from 35 to 60 vol %.

* * * * *